April 22, 1930.  J. BIJUR  1,755,626
LUBRICATION OF BEARINGS ON PIVOTED STRUCTURES
Filed July 2, 1927
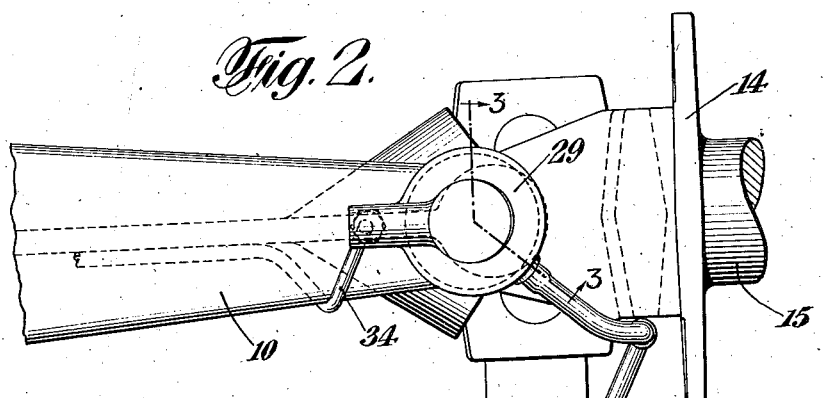
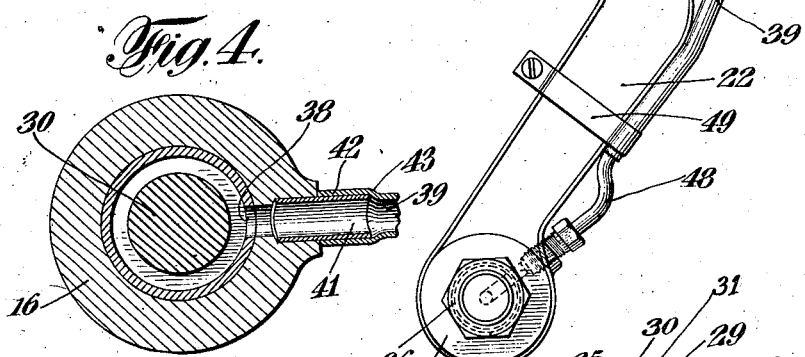
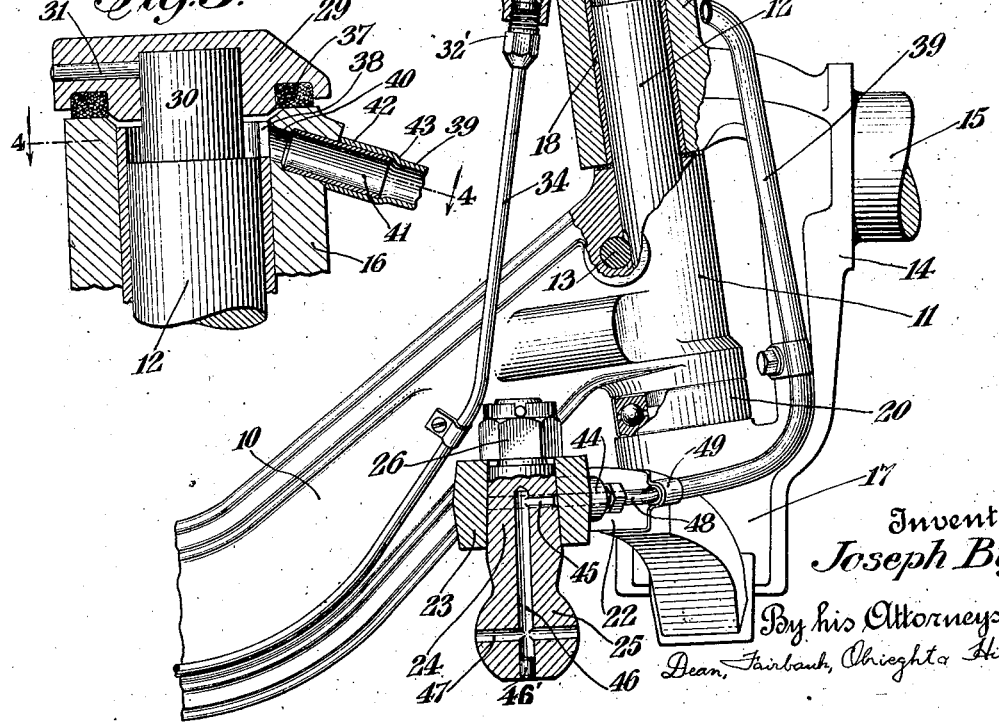
Inventor
Joseph Bijur
By his Attorneys
Dean, Fairbank, Chieghta Hirsch.

Patented Apr. 22, 1930

1,755,626

UNITED STATES PATENT OFFICE

JOSEPH BIJUR, OF NEW YORK, N. Y., ASSIGNOR TO AUTO RESEARCH CORPORATION, A CORPORATION OF DELAWARE

LUBRICATION OF BEARINGS ON PIVOTED STRUCTURES

Application filed July 2, 1927. Serial No. 202,995.

While certain of the features of my present invention are applicable to gravity flow systems broadly, the invention has a preferred use in association with pressure lubricating systems and more especially for delivering lubricant by gravity flow or displacement from a pressure line to a bearing of a structure having a swiveled or other movable relation with respect to the main lubricated structure, more especially where it is unfeasible or undesirable to convey the lubricant under pressure past or across such swivel or other connection.

The invention has a preferred application, although it is not so limited, for the lubrication of a tie rod or equivalent bearing carried by the pivoted steering knuckle, from a source on the frame or axle structure.

In a lubricating system such as that disclosed and claimed in my prior Patent No. 1,632,771 of June 14th, 1927, operating under pressure, leak might be incurred at the swivel mount of the steering knuckle or analogous pivoted member, were it attempted to force the lubricant thereacross for the bearing or bearings associated therewith.

Among the objects of the invention are to provide a lubricating installation, which while retaining all of the advantages of a pressure system in assuring prompt and reliable delivery of the respective charges of lubricant to the vicinities of the various bearings will, nevertheless, avoid leak of lubricant at the swivel mount of the knuckle or analogous part, without introducing any loose or flapping conduits to bridge across the swivel, and will assure the prompt delivery of the lubricant free from foreign matter to the bearing on the pivoted structure.

To achieve the desired result, I locate the drip plug or other pressure absorbing terminal employed in my prior patent before-mentioned in advance of the swivel mount of the steering knuckle, and I arrange the conduit system on said knuckle for travel of the lubricant from the drip plug to the bearing by simple gravity flow or displacement.

One of the special difficulties arising with gravity flow piping on the knuckle is that the oil would become arrested in an unvented downwardly extending pipe or conduit. Successive charges of lubricant from the source would remain in rather than flow out of a drooping pipe leading to the tie rod bearing, for instance, and only after a column of substantial weight had thus formed, following several lubricating operations, would any lubricant pass to the bearings, and at that time an overcharge would occur, the entire previously stanched column pouring into the bearing.

Any exposed venting aperture introduced to prevent such arrest of lubricant flow, would admit dust and dirt to the course of lubricant flow as long as it remained otherwise effective, but in normal use of the vehicle, it would become clogged with dirt and then no longer serve as a vent.

I have overcome the difficulty noted, without introducing other complications and without weakening or rendering more intricate the mechanical structure of the knuckle. According to my invention, the gravity pipe is so effectively sealed at its inlet against entry of dust or dirt that it is even shut off from the external air. The flow facilitating effect of a vent is, however, nevertheless produced according to my invention, broadly, by the simple expedient of providing the major part of the volume of those parts of the conduit system on the knuckle that are above the bearing member, of a bore, or internal diameter of cross-section sufficiently large to permit flow of the lubricant about the air confined therein, so that the air in the system is at all times substantially under atmospheric pressure and neither compressed nor rarified.

My invention lends itself to the use of bores or passages of quite small diameter in the ball stud or other outlet that communicates from the conduit system to the associated bearing, an outlet so small that the bore thereof would fill completely with lubricant.

By my invention, the lubricant would readily flow down one side of the large diameter pipe or bore on the knuckle while the air imprisoned in said bore would either remain stationary or pass to another part of the pipe, without being advanced in or ejected from the system by the flow of lubricant.

Lubricant admitted to the knuckle would thus quickly reach the bearing at the lower end of the conduit. The air imprisoned in the conduit system is of volume so great relative to that of any column of lubricant in the drooping outlet pipe or bore thereof, that the weight of such column exerts insufficient tension to appreciably rarfy the imprisoned air which remains substantially under atmospheric pressure throughout, whereby the system operates as if it were vented, so that air-blocking or lubricant stanching is precluded.

In the accompanying drawings in which is shown one of various possible embodiments of the several features of the invention, Fig. 1 is a fragmentary view partly in section of a knuckle embodying my invention, Fig. 2 is a plan view thereof, Fig. 3 is a fragmentary section taken on line 3—3 of Fig. 2, and;

Fig. 4 is a fragmentary section taken on line 4—4 of Fig. 3.

In the drawings is shown a fragmentary view of a steering knuckle installation, illustratively of the reverse Elliott type, which comprises an axle end 10 having an eye 11 through which extends a king pin 12 pinned rigidly to the axle by the key 13. The bearing ends of the king pin are straddled by the clevis jaws 16 and 17 of a knuckle 14 having a wheel spindle 15, said jaws having bushings 18 therein, providing bearing surfaces for the upper and lower ends respectively of the king pin. In the embodiment shown, the axle has a thrust ball bearing 20 sustained on the lower of the knuckle clevises. The knuckle shown has rigid therewith a tie rod arm 22, but no drag link arm, the right hand knuckle being illustratively shown. The tie rod arm has a tapered socket or eye 23, in which is secured the correspondingly tapered shank 24 of a downwardly extending ball stud 25 which provides a swivel bearing at its lower end for the corresponding socket (not shown) of the tie rod. The ball stud 25 is secured in place by an appropriate nut 26 threaded on the upper end thereof. The present invention is largely concerned with lubrication of the knuckle, the construction of which, as thus far described, is in itself not my invention.

To lubricate the knuckle, I have provided a lubricant inlet cap 29 having a central socket within which fits the reduced uppermost end 30 of the king pin which is made to protrude above the upper end of the upper clevis jaw 16. A cross pin 31 serves to key the cap to the king pin, so that the cap is accordingly held rigid with the axle.

The lubricant is admitted to the cap 29 preferably through an appropriate flow controlling fitting 32 which is retained by bushing 32' threaded into the lower face of an integral lug 33 of the cap that protrudes laterally toward the axle side thereof, which in this embodiment is illustratively in turn, supplied through a pipe 34 along the axle. The lubricant is propelled under pressure from a source (not shown) on the vehicle frame to the control fitting, which may be a drip plug and in which the pressure is preferably absorbed so that lubricant passes therebeyond to the knuckle at a measured rate, so slow that it will not flood the cavity under the cap.

The supply cap is bored as at 35 to drip into an annular well 36 formed about the reduced upper end of the king pin, the outer wall of said well formed by the upper end of the bushing 18.

In order to prevent dust and dirt from entering through the gap between the stationary cap 29 and the rocking or oscillating upper clevis 16, I have provided the construction shown, in which an annular compression gasket 37 is lodged in a circular groove in the cap 29. The gasket is of thickness such that it is compressed when the pin 31 is applied to secure the inlet cap to the king pin.

The annular well drains through a notch 38 in the bushing to a pipe 39 from which the tie rod bearing is supplied. The pipe is supplied at its upper end from an oblique bore 40 in the upper knuckle clevis with the lowermost part of which the base of notch 38 is aligned. For convenience of attachment for the upper end of pipe 39 a short attachment tube 41 is preferably fitted in a corresponding enlargement of bore 40 in the upper knuckle clevis. The outer end of pipe 39 is enlarged as at 42 to encircle the protruding end of tube 41 affording a shoulder 43 abutting the end of said tube. The lubricant passing by gravity to and through pipe 39, the joint will transmit without leak.

The construction just described by which the upper end of the knuckle conduit is affixed to the upper clevis is claimed in my co-pending application Ser. No. 429,539, filed February 19, 1930.

The length of pipe 39 extends generally downward along the structure of the knuckle and along the length of the arm 22 to the eye 23 in which the ball stud 25 is mounted, an appropriate terminal fitting serving to affix the outlet end of the pipe in a boss 44 formed on said eye. Ball stud 25 is supplied from the pipe by a radial bore 45 communicating with an axial bore 46 which delivers through radial bores 47 in the stud 25 to the tie rod end (not shown); the lower end of bore 46 being plugged as at 46'.

Although the knuckle swivels in cap 29 during steering, oil held in place at the gasket 37 by capillarity will bridge the gap between the knuckle and the cap thus preventing the entry of air. Accordingly, unless precluded or offset by appropriate construction or arrangement of parts, successive charges of lubricant from the source would remain in rather than flow out of the drooping pipe 39, and only after a column of substantial weight had thus formed, following several lubricating operations, would any lubricant pass to the bearings, and at that time an overcharge would occur, substantially the entire previously stanched column pouring into the bearing.

In order to avoid such stanching action, without, however, venting the knuckle, the simple expedient is adopted of forming the pipe 39 of relatively large diameter,—where oil of the grade of engine lubricating oil is used, not less than $\frac{3}{16}''$ bore. Lubricant in passing through said pipe will in that case trickle downward along a side thereof without ever filling the cross-section of the pipe bore. Downward flow of lubricant accordingly takes place without driving the air contained in the pipe ahead of it. The stanching of lubricant with consequent over-lubrication at long intervals is thus avoided.

While I may use a conduit that is large from end to end, an equally satisfactory operation ensues as noted, by making the outlet end of the conduit small. This is particularly useful in motor vehicles where it might not be possible to accommodate a large outlet by structure of standard size. A pipe having a small outlet, even one sealed at the inlet end, is adapted to permit oil to flow from the upper end to the lower end without having that flow force the air out of the intervening pipe of larger diameter. It therefore follows that any oil put into the top end of such pipe causes emission promptly of a corresponding quantity of oil at the lower end of the pipe, so that such pipe even though not vented at the top, will promptly transmit oil from the top to the bottom without the time interval required to fill it up. Accordingly, I make the bores 45, 46 and 47 of small diameter, as shown, in the order of $\frac{3}{16}''$ or less. Also to avoid undue weakening of the eye 23 by the use of the large bushing required for mounting the large diameter pipe 39, I prefer to provide pipe 39 with a short terminal length 48 of smaller diameter. The conduit length 48 is preferably telescoped and soldered into the terminal end of pipe 39. A strap 49 may be used at said soldered joint to lash the pipe to the tie rod arm.

The passages in the stud 25 and the small diameter of pipe 48 are such that lubricant would tend to fill the entire bore thereof and be permanently retained therein. The short downwardly extending column of lubricant in the bore 46 does not exert sufficient tension upon the more considerable volume of air within the main length of pipe 39 to effectively attenuate the air, so that the upper end of the lubricant column in the bearing stud 25 and in the terminal pipe length 48 remains under atmospheric pressure. Accordingly, in operation, lubricant delivered through the drip plug and trickling down through the length of pipe 39 will settle on top of the column in the tail end and will cause a corresponding quantity thereof to escape through lateral ports 47 into the bearing.

Thus, even though the oil-soaked gasket 37 at the top of the knuckle, in excluding dirt, substantially seals against venting or entry of air, the flow of lubricant nevertheless takes place as if the system were vented. As lubricant passes out of stud 25 substantially atmospheric pressure is maintained in the connecting piping 39 leading thereto. Without using large axial holes in the ball stud, and without using large weakening radial holes in the king pin of a steering knuckle, I thus reconstitute the parts so that the desired quantity of oil flows to the ball stud, as if it flowed down an open trough by gravity, reaching its terminal promptly after the oil has been supplied to the central distributing place, just as promptly as if there were no tendency to air blocking or stanching. The delivered oil, moreover, remains clean in transit.

It will be seen that the conduit is rigidly sustained along the knuckle and in non-flapping relationship with respect thereto in a location where it is inherently protected so that it is unlikely to be injured in use.

The invention though shown embodied in a knuckle of the reverse Elliot type is generically claimed to embrace its application also to knuckles of the Elliot type. Such latter application is shown and specifically claimed in my copending case Serial No. 56,435, filed September 15, 1925.

While the invention has a preferred application to the lubrication of steering knuckles, it will be understood that certain of the broader features thereof are of more general application in other relations and more especially in relations in which it is desired to lubricate from a fixed source by gravity flow, a bearing carried by a pivoted structure. The principle of the invention may accordingly be applied to the lubrication of brake rigging and the steering lever of motor vehicles.

While most of the lubricant from well 36 will drain through pipe 39 to stud 25, a little will seep from the bottom of the well to lubricate the king pin bushing 18.

I claim:—

1. In a motor vehicle, the combination of an axle, a knuckle assembly including a king pin having a bearing surface accommodating the steering movement of the knuckle, said knuckle having an arm with a bearing thereon, lubricant inlet means rigid with said axle and above said king pin, said assembly including a passageway along the structure of said knuckle extending from end to end thereof exteriorly of said king pin.

2. In a motor vehicle, in combination, an axle, a knuckle having a bearing rigid therewith, a king pin affording a pivot mount for said knuckle, a lubricant dividing well coaxial with the king pin, the entire length of the king pin bearing surface being toward one side of said well, said well in continuous open communication with the king pin bearing and with the other bearing to supply both said bearings by gravity flow and in parallel.

3. In a mechanical installation, in combination, a plurality of bearings, means for lubricating said bearings from a common source, said means comprising an annular lubricant dividing structure above, adjacent and substantially concentric with one of the bearings and having restricted communication therewith, and a gravity flow pipe having relatively free communication with said annular structure and leading therefrom to a more remote bearing, at a lower level.

4. In a knuckle for a motor vehicle, in combination, an axle, a knuckle, a king pin affording a steering mount for said knuckle, said king pin having a bearing bushing near its upper end, an annular lubricant well adjacent the upper end of said bushing, having restricted communication with the bearing surface thereof and a downwardly extending pipe having relatively free communication with said well, said bushing affording a relatively free passage for lubricant from said well to said pipe.

5. In combination, an axle, a knuckle, a king pin affording a steering mount for said knuckle, said king pin having a bearing bushing near its upper end, an annular lubricant well adjacent the upper end of said bushing, having restricted communication with the bearing surface of said bushing and a downwardly inclined pipe communicating through a corresponding port near the upper end of the bushing to drain lubricant from said well, said conduit leading to a bearing carried by the knuckle.

6. In a motor vehicle, the combination of an axle, a knuckle having a control bearing rigid therewith and having a mounting bearing with respect to said axle and at level higher than said control bearing, a conduit carried by said knuckle and leading from above said knuckle mount bearing to said control bearing, a lubricant inlet rigid with said axle and in open communication with said knuckle mount bearing and with said conduit in parallel, said knuckle mount bearing blocking leakage of lubricant to degree sufficient to afford a direct path of flow across the bearing surface thereof to said knuckle conduit for supplying said control bearing.

7. In a motor vehicle, the combination of an axle, a knuckle, a king pin affording a pivot mount at said axle, a pressure pipe line for leading lubricant to the bearings of said knuckle, a lubricant flow control element at the outlet end of said pipe line mounted rigid with said axle and near said king pin and absorbing pressure transmitted through said pipe line for gravity flow therebeyond, a lubricant passage-way caried by said knuckle and in flow intercepting relationship with respect to lubricant from said flow controlling member, said passage-way extending along parts of said knuckle in a generally downward direction to a bearing thereof, and affording a path along which lubricant can flow by gravity at rate at least as rapid as it is admitted through the pressure absorbing element.

8. In a chassis lubricating system, the combination of a lubricant supply cavity at higher level, pressure operating means contiguous to said cavity for feeding limited quantities of lubricant thereinto, a bearing at a lower level, a conduit open from end to end communicating at one end with said cavity and at the other with said bearing, and substantially sealed by said cavity and bearing against the entry of air, said conduit being constructed and arranged to prevent the exertion upon the cavity of a suction due to the weight in the conduit of lubricant from said cavity.

9. In a lubricating installation, in combination, an oil cavity at a higher level, a bearing at a lower level, conduit means connecting said cavity with said bearing, and affording an open passage from the cavity into the bearing, said conduit being constructed and arranged to prevent the exertion upon the cavity of a suction due to the weight in the conduit of lubricant from said cavity.

10. In a motor vehicle, in combination, a lubricant containing cavity at higher level, a bearing at lower level, piping connecting said cavity and said bearing to supply the latter by gravity flow, said piping affording an open passage from said cavity into said bearing, free from obstructing relationship with respect to the flow of lubricant, said piping being constructed and arranged to prevent the exertion upon the cavity of a suction due to the weight in the piping of lubricant from said cavity.

11. In a motor vehicle, the combination of a pivoted steering knuckle, an arm carried thereby, having a pivot bearing at the outer end thereof provided with a lubricant conveying bore of small diameter, a pipe carried by said knuckle for conveying lubricant by gravity flow downward from near the top thereof to said pivot bearing, said pipe substantially sealed against entry of air at the outer end thereof and of diameter sufficiently large to permit passage of lubricant therethrough about any air therein.

12. In a motor vehicle, the combination of an axle having a king pin, a knuckle having clevises bearing on the ends of said king pin, a tie rod arm rigid with said knuckle having a downwardly extending ball stud at the outer end thereof, means supplying lubricant to said knuckle, said means including an inlet rigid with said axle, a pipe carried by said knuckle and extending generally downward to said ball stud, having its upper end in flow-intercepting relationship with respect to lubricant from said inlet, a gasket interposed between said inlet and said knuckle to exclude dirt, thereby excluding air from said pipe, said pipe of diameter sufficiently large to permit gravity flow of lubricant around any air therein, said ball stud having a bore of diameter so small as to remain filled with a continuous column of lubricant therein.

13. In apparatus of the character described, the combination of an oil containing member at higher level, a structure member extending generally downward therefrom and having a bearing at the lower end thereof provided with a lubricant conveying bore of small diameter, a conduit along said structure member for conveying lubricant by gravity flow downward from said oil containing member to said bearing, said conduit substantially sealed against entry of air at the outer end thereof and of diameter sufficiently large to permit passage of lubricant therefrom about any air therein.

14. In a motor vehicle, the combination of an axle, a knuckle having a clevis straddling said axle, a king pin fixed in said axle and affording a bearing for said knuckle, said king pin extending upward beyond the upper end of said knuckle, a lubricant supply cap secured to said protruding end of the king pin and having an extension free from conflict with respect to the parts on said knuckle, a lubricant control fitting secured in the under side of said extension and adapted to be supplied through a pipe from a remote source of lubricant and a compression gasket enclosed between the upper end of the knuckle and said inlet cap to prevent the entry of dust to the bearing surfaces, said cap affording a passage to an annular chamber near the upper end of the clevis from which the knuckle is lubricated.

15. The combination of an axle, a steering knuckle having an arm with a bearing thereon, said knuckle having a clevis straddling the axle, a king pin therefor, bushings for the bearing ends of said king pin located in said clevis, a lubricant inlet fitting rigid with said axle and near the upper end of the king pin, an oil duct through the upper jaw of said clevis, laterally of said king pin and leading to said bearing, and a notch in the upper end of the upper bushing through which lubricant from said inlet fitting is delivered to said duct.

16. In a chassis lubricating system, the combination of a source of lubricant at higher level and a bearing at lower level, a conduit communicating between said source and said bearing, said bearing having a small duct through the structure thereof leading to the wear surface, and normally oil-filled, said conduit substantially sealed against venting at its upper end, said conduit of bore sufficiently large, for the major part of the length thereof, to permit flow of lubricant about any air therein.

17. In a steering knuckle, the combination of a steering arm having an eye and a ball stud affixed in said eye, said stud having small diameter bores therein for conveying lubricant from said eye to the wear surface, means for conveying lubricant from the axle to said stud, said means comprising a lubricant inlet carried by the axle, a lubricant conduit carried by the knuckle and leading from near said inlet along the knuckle structure to said eye, a substantially air-tight swivel between the knuckle and the axle, thereby precluding the venting of said conduit, the major part of the length of said conduit being of bore so large as to permit the flow of lubricant about any air therein.

18. The steering knuckle as claimed in claim 17 in which the end of the lubricant conduit at the steering arm eye is a terminal pipe portion of smaller diameter telescoped at its inlet end into the outlet end of said conduit and is affixed by a small terminal member to said eye.

Signed at New York city in the county of New York and State of New York this 15th day of June, A. D. 1927.

JOSEPH BIJUR.